US 6,678,477 B1

(12) United States Patent
Matsuda et al.

(10) Patent No.: US 6,678,477 B1
(45) Date of Patent: Jan. 13, 2004

(54) SPATIAL TRANSMISSION OPTICAL TRANSCEIVER

(75) Inventors: Junichi Matsuda, Tokyo (JP); Shuntaro Yamazaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/158,583

(22) Filed: Sep. 22, 1998

(30) Foreign Application Priority Data

Sep. 30, 1997 (JP) .............................................. 9-266642
Mar. 2, 1998 (JP) .......................................... 10-049082

(51) Int. Cl.⁷ ........................ H04B 10/00; H04B 10/08; H04B 17/00
(52) U.S. Cl. ............................. 398/136; 398/9; 398/15; 398/22; 398/25; 398/33; 398/135; 398/17
(58) Field of Search ................................ 359/152, 153, 359/110, 177; 398/9, 15, 22, 25, 33, 135, 136

(56) References Cited

U.S. PATENT DOCUMENTS

| | | | | |
|---|---|---|---|---|
| 4,516,221 A | * | 5/1985 | Nakata et al. ............... | 364/900 |
| 5,142,400 A | * | 8/1992 | Solinsky ...................... | 359/159 |
| 5,229,593 A | * | 7/1993 | Cato ............................ | 250/205 |
| 6,044,256 A | * | 3/2000 | Kobayashi ................... | 455/404 |

FOREIGN PATENT DOCUMENTS

| | | | | |
|---|---|---|---|---|
| JP | 10-202940 | 8/1989 | | |
| JP | 2-223249 | 9/1990 | | |
| JP | 2-280545 | 11/1990 | | |
| JP | 3-203420 | 9/1991 | | |
| JP | 3-239027 | 10/1991 | | |
| JP | 5-153057 | * 11/1991 | ........... | H04B/10/10 |
| JP | 10-105437 | 4/1992 | | |
| JP | 5-153057 | 6/1993 | | |
| JP | 6-132898 | 5/1994 | | |
| JP | 7-107037 | 4/1995 | | |
| JP | 7-183849 | 7/1995 | | |
| JP | 7-212280 | 8/1995 | | |
| JP | 9-149325 | 6/1997 | | |
| JP | 10-41898 | 2/1998 | | |
| JP | 10-70508 | 3/1998 | | |
| JP | 10-154996 | 6/1998 | | |
| JP | 10-224353 | * 8/1998 | ........... | H04L/12/28 |

OTHER PUBLICATIONS

Yamazaki, Shuntaro, "IEEE 1394 Multimedia Home Network", Electronic Technology, Nikkan Kogyo Newspapers Ltd., Mar. 1998, p. 107 to 111.
"Fundamental of Optoelectronics", p. 26, issued by Keigaku Publication Co. Ltd.

* cited by examiner

Primary Examiner—Leslie Pascal
Assistant Examiner—M. R. Sedighian
(74) Attorney, Agent, or Firm—Scully, Scott, Murphy & Presser

(57) ABSTRACT

In a spatial transmission optical transceiver, signals of two lines from a feeder-affixed twisted pair line 17 which is a data transmission line based on IEEE1394 standard are converted to signals of one line by a code conversion circuit 14, and further converted to optical signals and emitted to space by a optical transmitter 15. The optical signal transmitted through the space is converted to an electrical signal by a optical receiver 16. The code conversion circuit 14 receiving the electrical signal of one line thus converted to signals of two lines, and transmits the signals onto the feeder-affixed twisted pair line 17. The electrical signal from the optical receiver 16 is input to an interception and insertion/removal detection circuit 13 to detect the presence or absence of the optical signal and judge whether the received signal is a reflection signal, thereby detecting the interception of a communication path and the insertion/removal of a signal line connected to a confronting optical transceiver. The detection result is transmitted to a bias circuit 12, and when no optical signal is received or the reception signal is the reflection signal, the bias circuit 12 stops the bias voltage application to the feeder-affixed twisted pair line 17.

18 Claims, 11 Drawing Sheets

F I G. 6
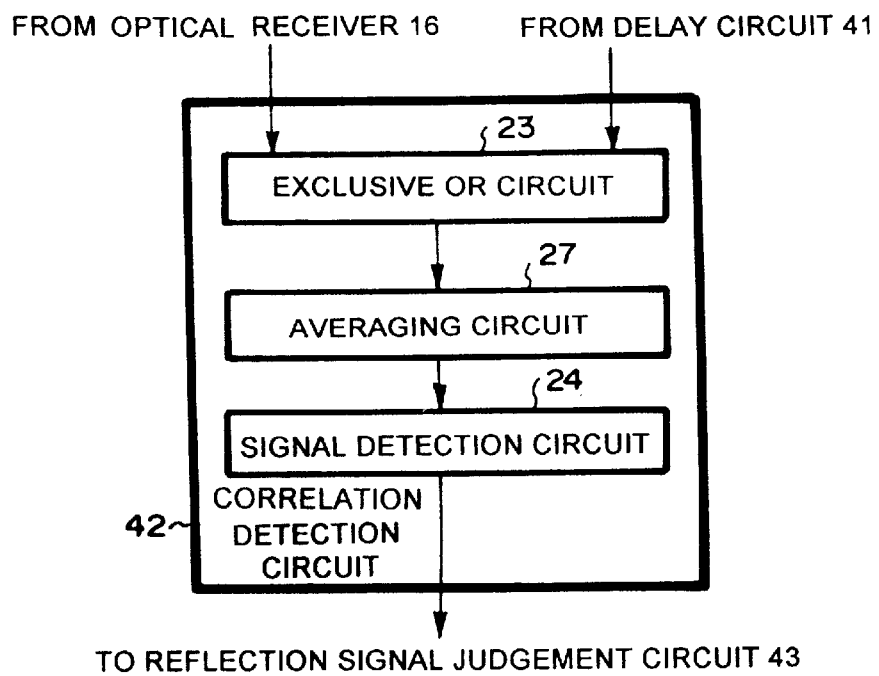
F I G. 8
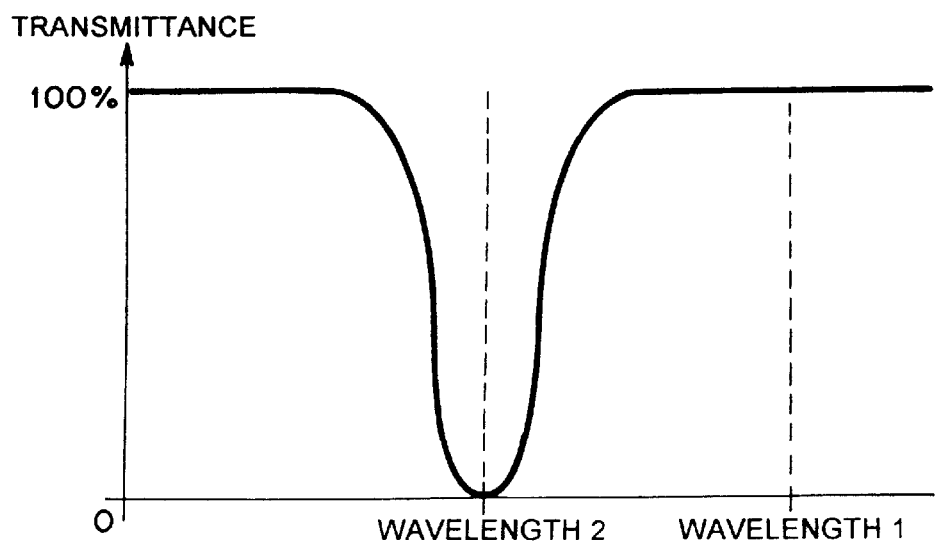

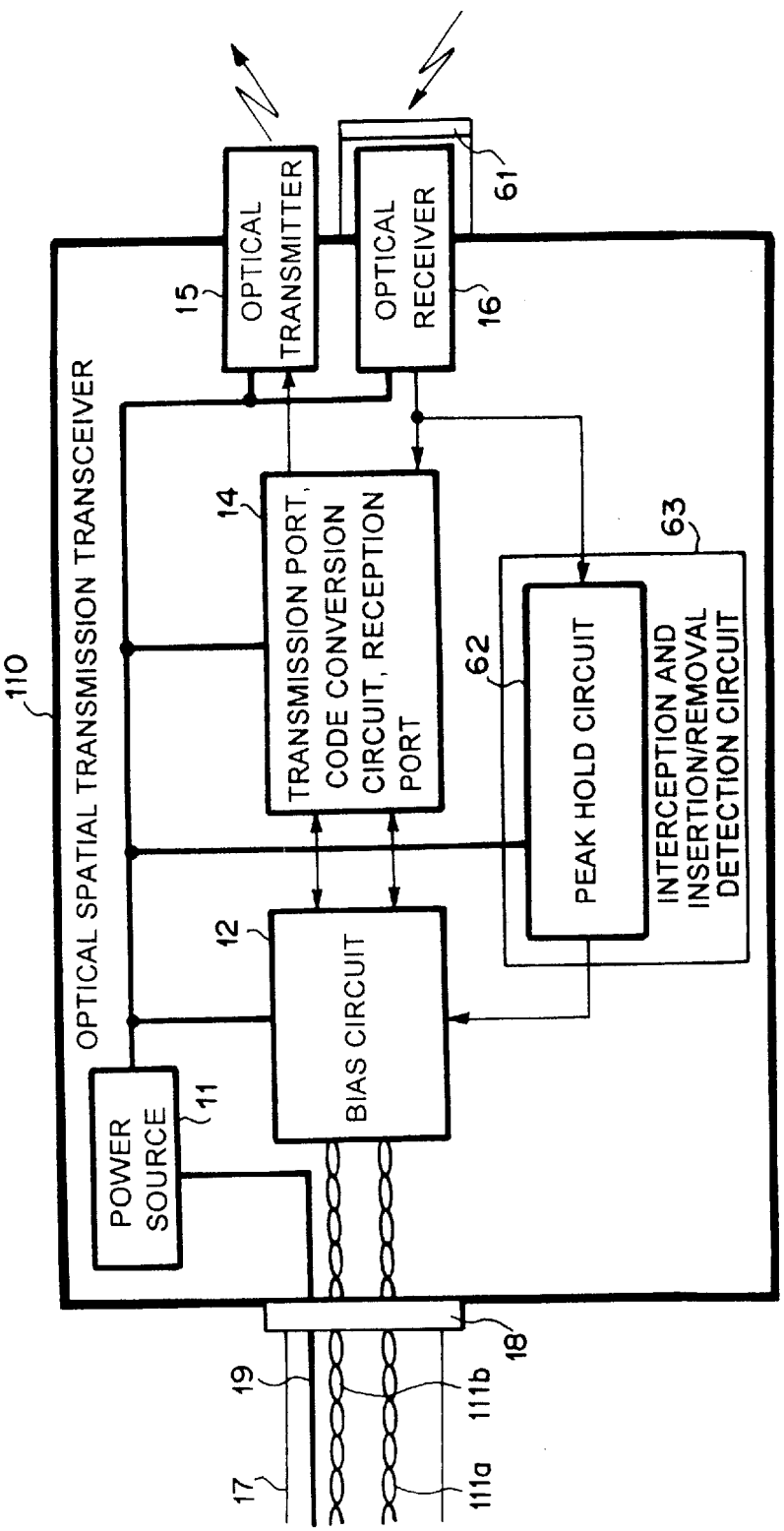

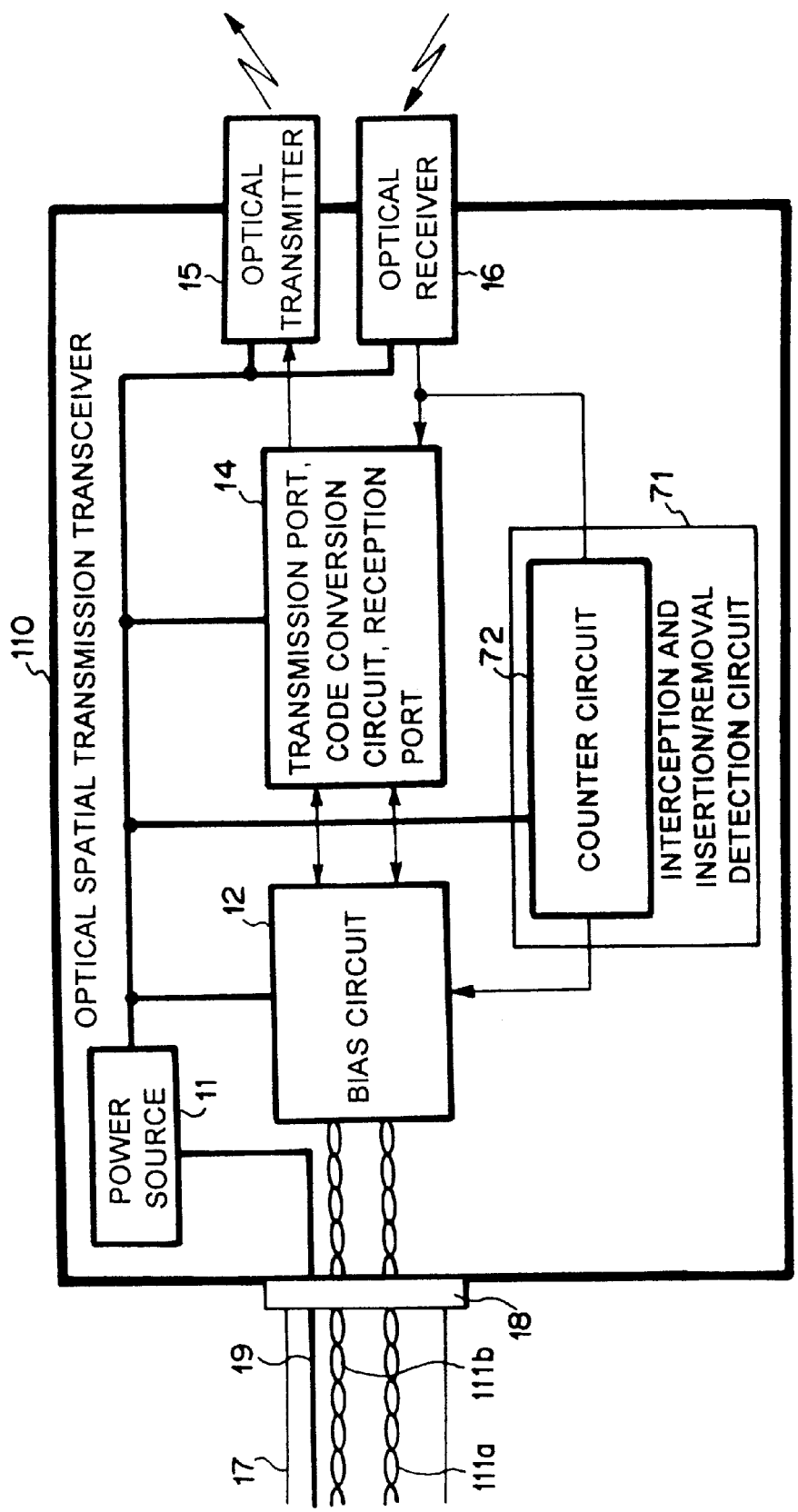

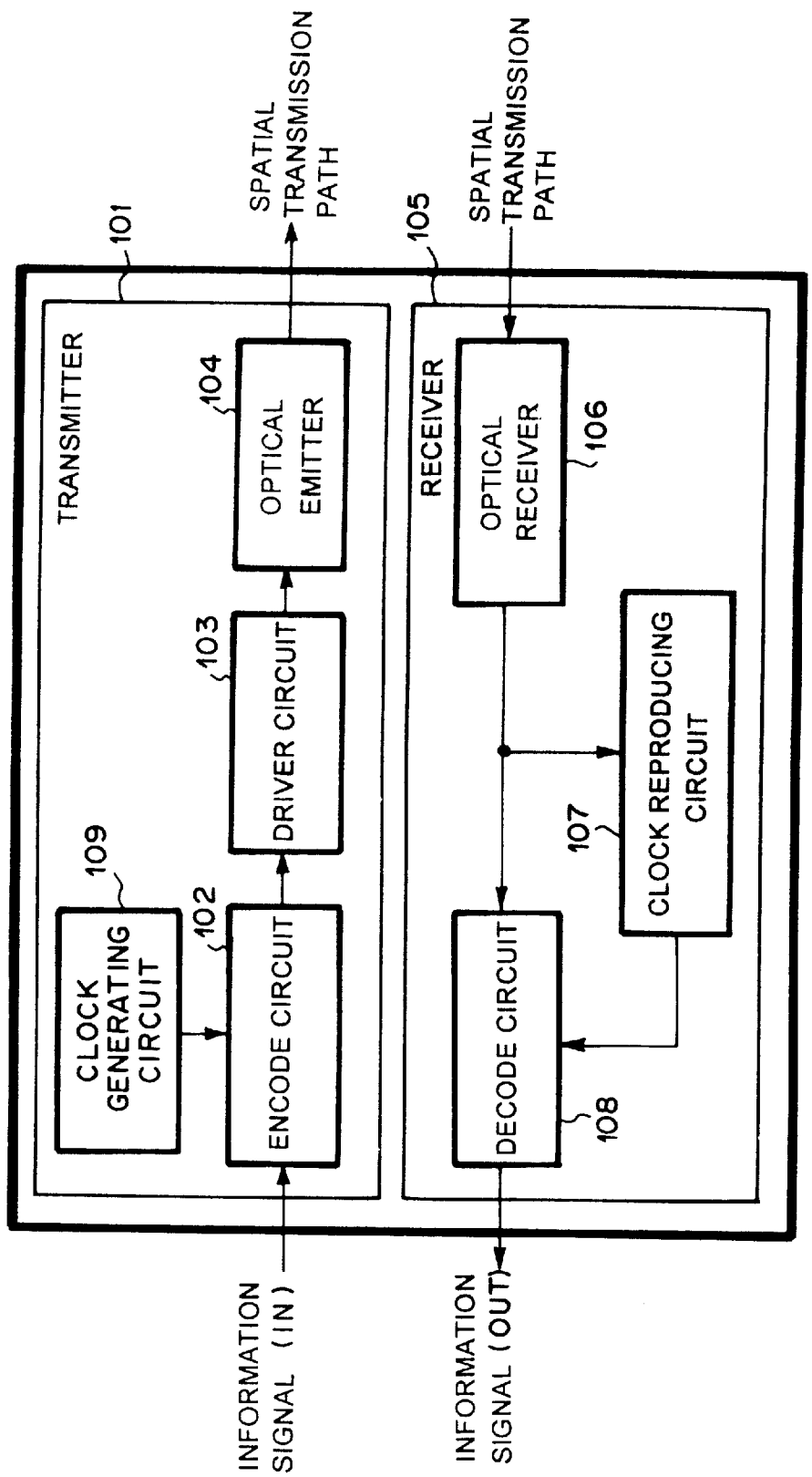

SPATIAL TRANSMISSION OPTICAL TRANSCEIVER

BACKGROUND OF THE INVENTION

1. Field of the Invention

The present invention relates to a spatial transmission optical transceiver (transmitter/receiver) for transmitting/receiving optical signals through space serving as a medium between terminal devices in a network in which a plurality of terminal devices are connected to one another through a serial bus.

Here, the serial bus is used a high-speed serial bus which is standardized in IEEE (The Institute of Electrical and Electronics Engineers) 1394 ("IEEE Standard for a High Performance Serial Bus", IEEE Inc., 96.8).

2. Description of the Related Art

A requirement for transmitting a huge mass of data between equipments is now increasingly enhanced in connection with recent enhancement of processing capabilities of computers and increasing requirements for handling a mass of data which are represented by motion pictures. FIG. 10 is a block diagram showing a network using IEEE1394.

In FIG. 10, the respective terminal devices are connected to one another through a feeder-affixed twisted pair line 82 into which a transmission path based on the IEEE1394 standard and a feeder are unified, and each terminal device applies a bias voltage to a twisted pair line. When a feeder-affixed twisted pair line is inserted into or removed from a terminal device, the terminal device concerned detects variation of the bias voltage to detect the insertion/removal of the feeder-affixed twisted pair line and transmits a reset signal to initialize an IEEE1394 network.

FIG. 11 is a block diagram showing the construction of a optical transceiver disclosed in Japanese Laid-open patent Application No. Hei-10-41898 which uses an optical fiber as a part of the transmission path. The optical transceiver is connected to a terminal device through a feeder-affixed twisted pair line based on the IEEE1394 standard, and an optical fiber can be used for a part of the transmission path of the IEEE1394 network.

The operation of the optical transceiver will be described hereunder.

In FIG. 11, the optical transceiver used through the optical fiber comprises a bias circuit 91, a code conversion circuit 92, a peak hold circuit 93, a optical transmitter 94, a optical receiver 95, a power circuit 96, an electrical connector 98 to which a feeder-affixed twisted pair line 97 based on the IEEE1394 standard is connected, and an optical connector 910 to which an optical fiber 99 is connected.

The optical transmitter 94 converts an electrical signal from the code conversion circuit 92 to an optical signal, and transmits the optical signal thus converted through the optical connector 910 onto an optical fiber 99b. The optical transmitter 94 has a function of converting the optical signal received by the optical connector 910 to an electrical signal, performing waveform shaping and then outputting it to the code conversion circuit 92 and the peak hold circuit 93.

The feeder-affixed twisted pair line 97 has two twisted pair lines, and signals of two lines exist in the feeder-affixed twisted pair line 97. The code conversion circuit 92 has a function of converting the signals of two lines to signals of one line so that the signals of two lines can be transmitted through the optical fiber 99 when an optical transmission is outputted, and a function of converting the optical signals of one line thus received to signals of two lines so that the signals can be transmitted on a twisted pair line.

The peak hold circuit 93 has a function of detecting the presence or absence of an optical signal on the basis of the electrical signal which is converted from the optical signal by the optical receiver 95, and a function of controlling the bias circuit 91 on the basis of the detection result. The bias circuit 91 has a function of applying a bias voltage to each twisted pair line 912a and 912b of the feeder-affixed twisted pair line 97 connected to the electric connector 98, and it is controlled on the basis of the output of the peak hold circuit 93. Specifically, when it receives an optical signal, it applies a bias voltage to the twisted pair line 912a and 912b, and when it receives no optical signal, it stops the voltage application, whereby a terminal device can detect insertion/removal of a feeder-affixed twisted pair line 912a and 912b or insertion/removal of an optical fiber 99a and 99b to initialize the IEEE1394 serial bus.

Further, a communication system based on optical or electrical waves by using space as a medium may be utilized from the viewpoint that rewiring due to movement of terminal devices or arrangement of twisted pair lines (cables) in a wiring process spoils the beauty of the appearance. The radio transmission system based on optical technique is called as "optical spatial transmission system", and it is described in "FUNDAMENTALS OF OPTOELECTRONICS" p. 26 issued by Keigaku Publication Co., Ltd., for example.

FIG. 12 is a block diagram showing an optical spatial transmission device disclosed in Japanese Laid-open Patent Application No. Hei-7-183849. The construction and operation of the optical spatial transmission device will be briefly described with reference to FIG. 12.

In the optical spatial transmission device of FIG. 12, a transmitter 101 includes an encode circuit 102 for converting an input information signal to a base band code, a driver circuit 103 for driving a optical emission unit 104 on the basis of the base band code, and the optical emission unit 104 for converting an electrical signal from the driver circuit 103 to an optical signal and discharging the optical signal to space. A receiver 105 includes a optical reception unit 106 for receiving the optical signal from a spatial transmission path and converting the received optical signal to an electrical signal, a clock reproducing circuit 107 for reproducing a clock signal from the received optical signal, and a decode circuit 108 for reproducing a base band code from the reproduced clock signal and the electrical signal from the optical receiving unit 106, and outputting an information signal.

In order to solve the rewiring problem due to motion of terminal devices and the appearance-spoiling problem due to the arrangement of cables in the above-described prior art, it is considered that the optical spatial transmission system is applied to the optical transmission/reception portion of the optical transceiver of FIG. 11. In this case, when the optical communication path is intercepted in the neighborhood of the optical receiving unit and reflected optical is incident to the optical receiving unit, the optical spatial transmission device receives the reflection signal and thus cannot detect the interception of the communication path. Therefore, erroneous data are delivered to a terminal device, and thus the terminal device operates abnormally.

SUMMARY OF THE INVENTION

An object of the present invention is to provide a spatial transmission optical transceiver which can transmit/receive an optical signal through space serving as a communication medium between terminal devices in a network in which plural terminal devices are connected to one another through a data transmission line based on IEEE1394.

In order to attain the above object, a spatial transmission optical transceiver according to the present invention is characterized by detecting interception of a communication path and insertion/removal of a data transmission line connected to a confronting optical transceiver for spatial transmission.

Particularly, even when the optical transceiver for spatial transmission receives reflected optical due to interception of a communication path in the neighborhood of a optical transceiver, the spatial transmission optical transceiver of the present invention detects the interception of the communication path. Specifically, the spatial transmission optical transceiver according to the present invention includes optical signal detection means for detecting the presence or absence of an optical signal on a spatial transmission path, and reflection signal detecting means for detecting that a reception signal is a reflection signal on the basis of a transmitted/received signal.

Further, the spatial transmission optical transceiver according to the present invention is characterized by detecting the interception of the communication path or the insertion/removal of a signal line and notifying the detection result to a terminal device. Specifically, there is also provided with communication path interception/signal line insertion/removal notifying means for detecting the interception of the communication path and the insertion/ removal of the data transmission line connected to the confronting spatial transmission optical transceiver are detected, and notifying the detection result to the terminal device.

According to the present invention, the insertion/removal of the data transmission line connected to the confronting spatial transmission optical transceiver and the interception of the communication path can be detected on the basis of the presence or absence of the optical signal. Further, the interception of the communication path can be detected by detecting the reflection signal due to the interception of the communication path in the neighbor of the spatial transmission optical transceiver. When there is no reception signal, it is judged that the data transmission line is removed or the communication path is intercepted, and this fact is notified to the terminal device. Further, even when the reflection optical of the transmission optical signal is incident to the optical transceiver due to the interception of the communication path in the neighborhood of the optical transceiver, the received optical signal is detected to be a reflection signal to thereby detect the interception of the communication path, and this fact is notified to the terminal device, whereby the terminal device can detect the insertion/ removal of the data transmission line and the interception of the communication path, and thus a reset signal serving as a sign to initialize the network.

BRIEF DESCRIPTION OF THE DRAWINGS

FIG. 6 is a diagram showing a specific example of a correlation detection circuit according to the second embodiment of the present invention;

FIG. 7 is a diagram showing the construction of a spatial transmission optical transceiver according to a third embodiment of the presents invention;

FIG. 8 is a diagram showing a transmission characteristic of a optical wavelength discriminator according to the third embodiment of the present invention;

FIG. 9 is a diagram showing the construction of a spatial transmission optical transceiver according to a fourth embodiment of the present invention;

FIG. 12 is a diagram showing the construction of a conventional transmission/reception device for spatial transmission.

DETAILED DESCRIPTION OF PREFERRED EMBODIMENTS

Preferred embodiments according to the present invention will be described hereunder with reference to the accompanying drawings.

<Embodiment 1>

Figure 1:
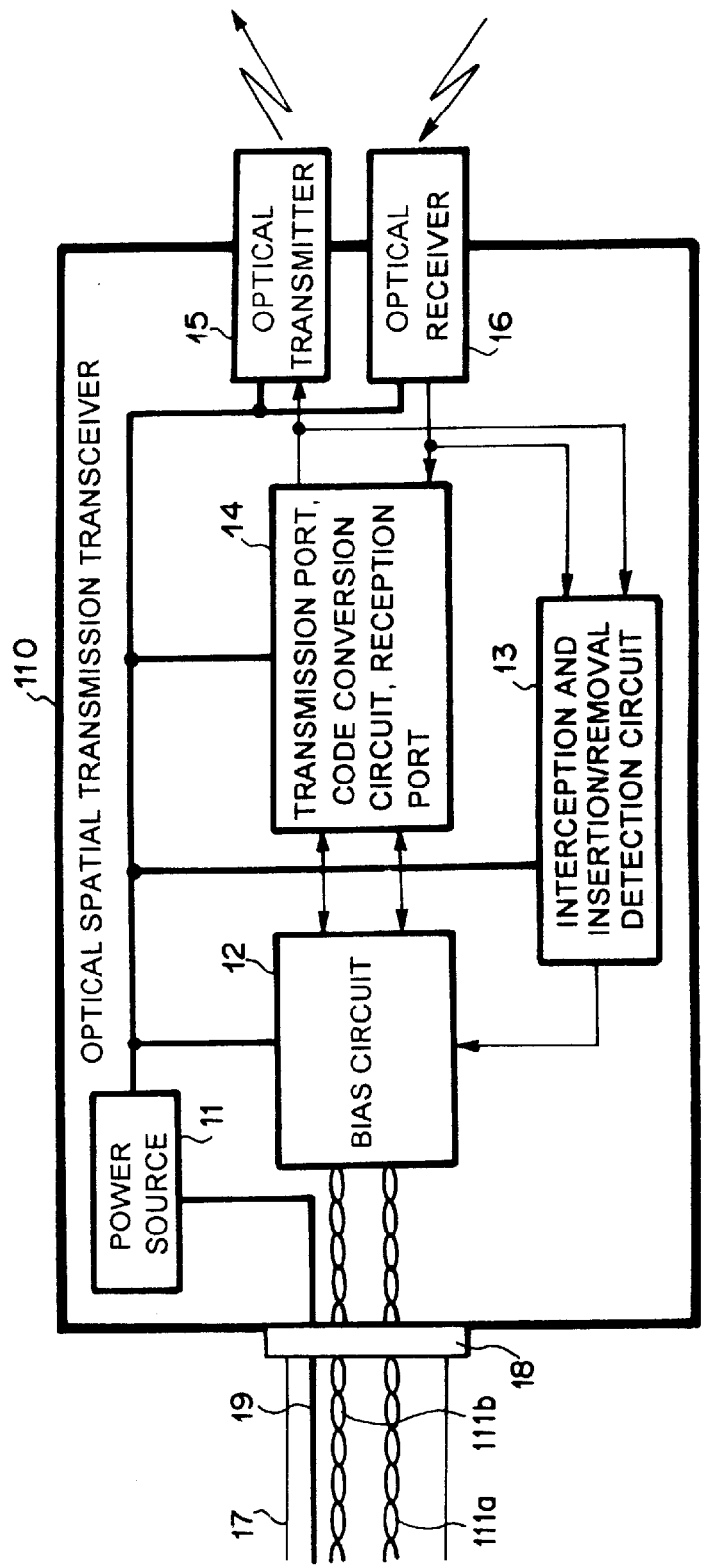
FIG. 1 is a block diagram showing the construction of an optical transceiver according to a first embodiment of the present invention.

FIG. 1 is a block diagram showing the construction of a spatial transmission optical transceiver according to a first embodiment of the present invention.

In FIG. 1, a optical spatial transmission transceiver 110 includes a power circuit 11, a bias circuit 12, an interception and insertion/removal detection circuit 13, a code conversion circuit 14, a optical transmitter 15, a optical receiver 16 and an electrical connector to which a feeder-affixed twisted pair line 17 serving as a data transmission line based on IEEE1394 standard is connected.

With respect to the power feeding function and the bias function which are associated with the feeder-affixed twisted pair line 17 based on the IEEE1394 standard, it should be noted that this embodiment can be executed without losing these two functions when an optical spatial transmission is performed.

The feeder-affixed twisted pair line 17 and the optical spatial transmission transceiver 110 are connected to each other through the electrical connector 18. Input/output of signals between the feeder-affixed twisted pair line 17 and the optical spatial transmission transceiver 110 is performed through the code conversion circuit 14. The code conversion circuit 14 converts to electrical signals of one line electrical signals of two lines which are input from the feeder-affixed twisted pair line 17 through the bias circuit 12, and outputs the electrical signals thus converted to the optical transmitter 15 and the interception and insertion/removal detection circuit 13. Further, the code conversion circuit 14 also has a function of converting electrical signals of one line from the optical receiver 16 to electrical signals of two lines and then transmitting the electrical signals thus converted through the bias circuit 12 to the feeder-affixed twisted pair line 17.

The optical transmitter 15 has a function of converting an electrical signal to an optical signal and discharging the optical signal thus converted to space. The optical receiver 16 has a function of converting to an electrical signal an optical signal which is transmitted through space serving as a medium and performing waveform shaping. In this case, the space is used as a communication medium, however, an optical fiber may be connected to a connector to achieve optical transmission with little loss.

The interception and insertion/removal detection circuit 13 has a function of detecting the presence or absence of an optical signal on the basis of a reception signal input from the optical receiver 16 and a transmission signal input from the code conversion circuit 14, and also a function of detecting whether the optical signal received by the optical receiver 16 is a reflection signal of the optical signal transmitted therefrom.

The power circuit 11 has a function of converting, to a voltage level used in the optical transceiver, a DC voltage which is supplied from the feeder 19 of the feeder-affixed twisted pair line 17 serving as the data transmission line based on the IEEE1394 standard. Further, it also has a function of supplying the DC voltage to another connected equipment on the basis of the IEEE1394 standard.

The bias circuit 12 has a function of applying a bias voltage to each twisted pair line 111a, 111b of the feeder-affixed twisted pair line 17 connected to the electrical connector 18, and it can control the application of the bias voltage on the basis of the output of the interception and insertion/removal detection circuit 13. In the IEEE1394 standard, it is necessary to supply the two twisted pair lines with DC voltage indexing 0, 1, z for specifying the data structure before a start packet for data transmission is transmitted, and this operation is performed by the bias circuit 12.

Next, the details of the interception and insertion/removal detection circuit 13 will be described with reference to the accompanying drawings.

Figure 2:
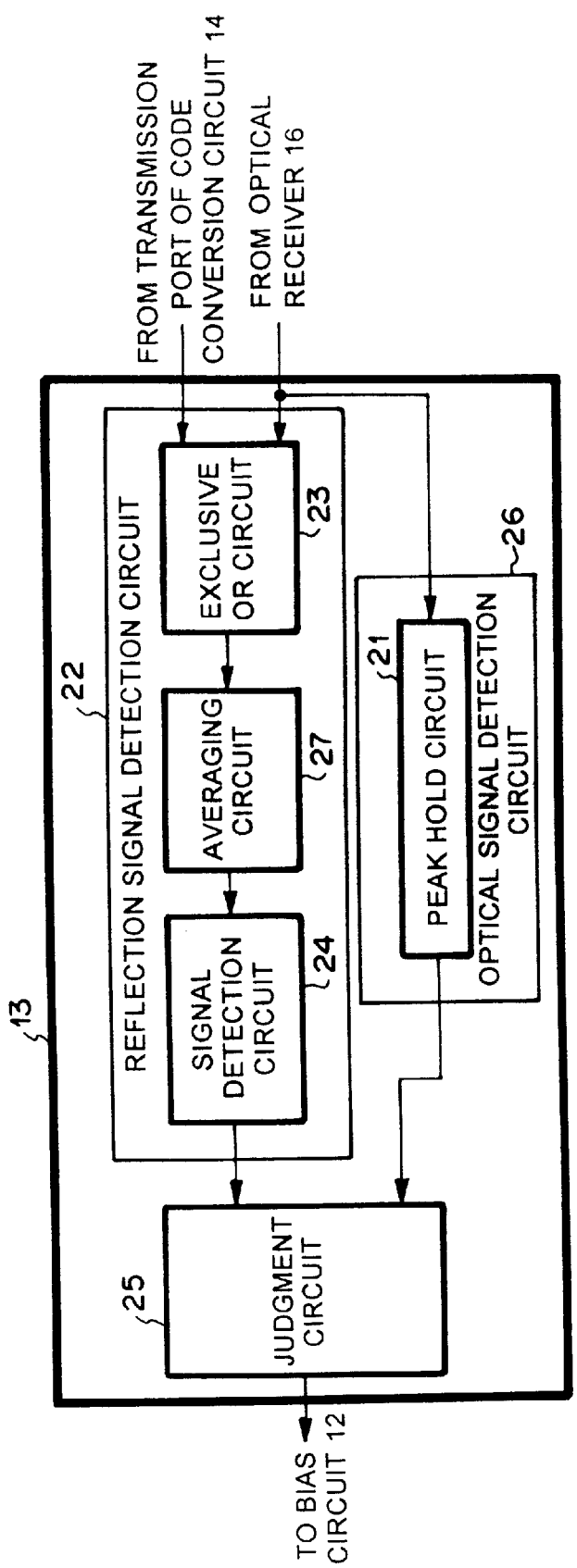
FIG. 2 is a diagram showing an interception and insertion/ removal detection circuit.

FIG. 2 shows an example of the insertion and insertion/removal detection circuit 13. The interception and insertion/removal detection circuit 13 comprises an optical signal 10 detection circuit 26, a reflection signal detection circuit 22 and a judgment circuit 25. The optical receiver 16 converts the received optical signal to an electrical signal, and inputs the electrical signal thus converted to the optical signal detection circuit 26 and the reflection signal detection circuit 22. The optical signal detection circuit 26 comprises a peak hold circuit 21, and it detects the presence or absence of the optical signal on the basis of the input electrical signal and outputs the detection result. The reflection signal detection circuit 22 comprises an exclusive OR circuit 23 an averaging circuit 27 for averaging the amplitude of an output signal from the exclusive OR circuit 23, and a signal detection circuit 24, and the reflection signal detection circuit 22 receives, as input signals, an electrical signal (transmission signal) transmitted from a transmission port of the code conversion circuit 14, and an electrical signal (reception signal) to which the optical signal received by the optical receiver 16 is converted. The reflection signal detection circuit 22 judges on the basis of the input transmission signal and reception signal whether the reception signal is the reflection signal, and outputs the judgment result. The judgment circuit 25 takes the logical product between the detection signal from the optical signal detection circuit 26 and the detection signal from the pflection signal detection circuit 22, and outputs the result to the interception and insertion/removal detection result.

Next, the operation of the interception and insertion/removal detection circuit 13 will be described in detail with reference to the accompanying drawings.

Figure 3:
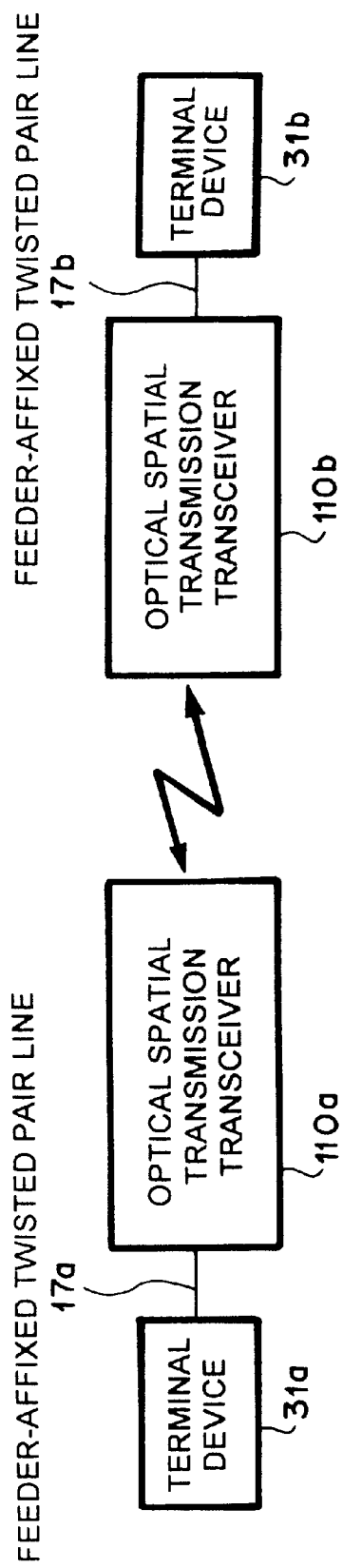
FIG. 3 is a diagram showing a communication mode between terminal devices through the optical transceiver of the present invention.
Figure 4:
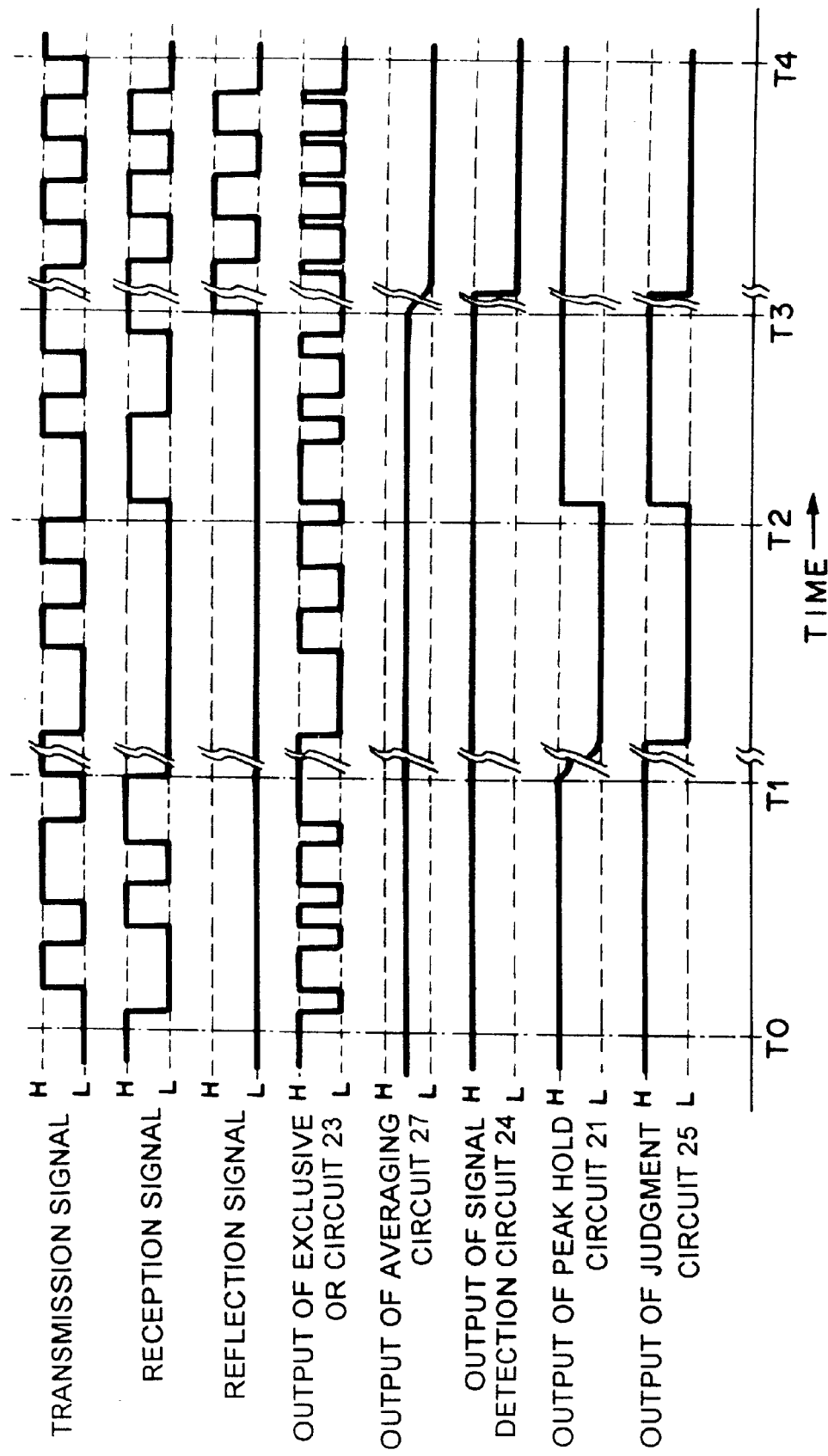
FIG. 4 is a time chart showing the operation of the interception and insertion/removal detection circuit.

A communication mode between terminal devices as shown in FIG. 3 is provided as an example. Referring to FIG. 4, it is assumed that neither the interception of the communication path occurs, nor the insertion/removal of the feeder-affixed twisted pair line 17 connected to the confronting optical transceiver occurs during the time period from T0 to T1. At this time, the peak hold circuit 21 of the optical signal detection circuit 26 of the interception and insertion/removal detection circuit 13 detects the signal to output a voltage of H level. Further, the exclusive OR circuit 23 of the reflection signal detection circuit 22 takes the exclusive OR between the input transmission signal and reception signal.

When the communication path is in the normal state and thus neither insertion nor removal of a feeder-affixed twisted pair line 17 occur, the optical signal received by the optical spatial transmission transceiver 110a is transmitted from the optical spatial transmission transceiver 110b, and there is no correlation relationship between the transmission signal and the reception signal at the optical spatial transmission transceiver 110a. Accordingly, a random signal which has no correlation with the transmission signal is output from the exclusive OR circuit 23, and the output voltage of the averaging circuit 27 for averaging the amplitude voltage of the output signal from the exclusive OR circuit 23 is above a threshold value of the signal detection circuit 24, so that the signal detection circuit 24 outputs a voltage of H level. The judgment circuit 25 takes the logical product between the output of the reflection signal detection circuit 22 and the output of the peak hold circuit 21 of the optical signal detection circuit 26, and outputs an H-level signal.

Subquently, when the communication path is intercepted during the period from T1 to T2 so that the reflection optical of the optical signal transmitted from the optical spatial transmission transceiver 110a is not incident to the optical receiver 16, the input from the optical receiver 16 to the peak hold circuit 21 of the optical signal detection circuit 26 is set to L-level, and thus the peak hold circuit 21 outputs a voltage of L level. At this time, thexclusive OR circuit 23 of the reflection signal detection circuit 22 outputs the same signal as the transmission signal, and the output voltage of the averaging circuit 27 is above the threshold value of the signal detection circuit 24, so that the signal detection circuit 24 outputs a voltage of H level. The judgment circuit 25 takes the logical product between the output of the reflectin signal detection circuit 22 and the output of the peak hold circuit 21 of the optical signal detection circuit 26, and outputs a voltage of L level. The bias circuit 12 to which the voltage of L level is input stops the bias voltage application to the twisted pair lines 111a, 111b.

Subsequently, during the time period from T2 to T3, when the communication path is restored, the interception and insertion/removal detection circuit outputs a voltage of H level again, the bias circuit 12 to which the voltage of H level is input applies a bias voltage to each of the twisted pair lines 111a, 111b.

Subsequently, it is assumed that during the time period from T3 to T4, the communication path is intercepted in the neighborhood of the optical spatial transmission transceiver 110a and the reflection optical is received by the optical receiver 16. In this case, the peak hold circuit 21 of the optical signal detection circuit 26 to which the electrical signal is input from the optical receiver 16 outputs the voltage of H level. At this time, the reception signal (reflection signal) which is input to the exclusive OR circuit 23 of the reflection signal detection circuit 22 is shifted in synchronization with respect to the transmission signal by the delay time, and the exclusive OR circuit 23 outputs the H-level voltage for the delay time between the signal from the optical receiver 16 and the signal from the transmission port. Accordingly, the output voltage of the averaging circuit 27 is reduced to be below the threshold value of the signal detection circuit 24, so that the signal detection circuit 24 outputs the L-level voltage. The judgment circuit 25 takes the logical product between the output of the reflection signal detection circuit 22 and the output of the peak hold circuit 21 of the optical signal detection circuit 26, and outputs the L-level voltage. The bias circuit 12 to which the L-level voltage is input stops the application of the bias voltage to the twisted pair line 111.

<Embodiment 2>

In the above embodiment 1, on the basis of the result of the exclusive OR between the transmission and reception signals, the correlation between the transmission signal and the reception signal is taken to detect the reflection signal. As the transmission distance of the reflection signal is long, the delay time is longer and the correlation between the two signals is weaker. However, by delaying the transmission signal in advance, the reception signal can be identified as the reflection signal even when the delay time is long.

Next, an embodiment of the interception and insertion/removal detection circuit 13 which can detect that the reception signal is the reflection signal even when the delay time of the reflection signal is long will be described in detail with reference to the accompanying drawings.

Figure 5:
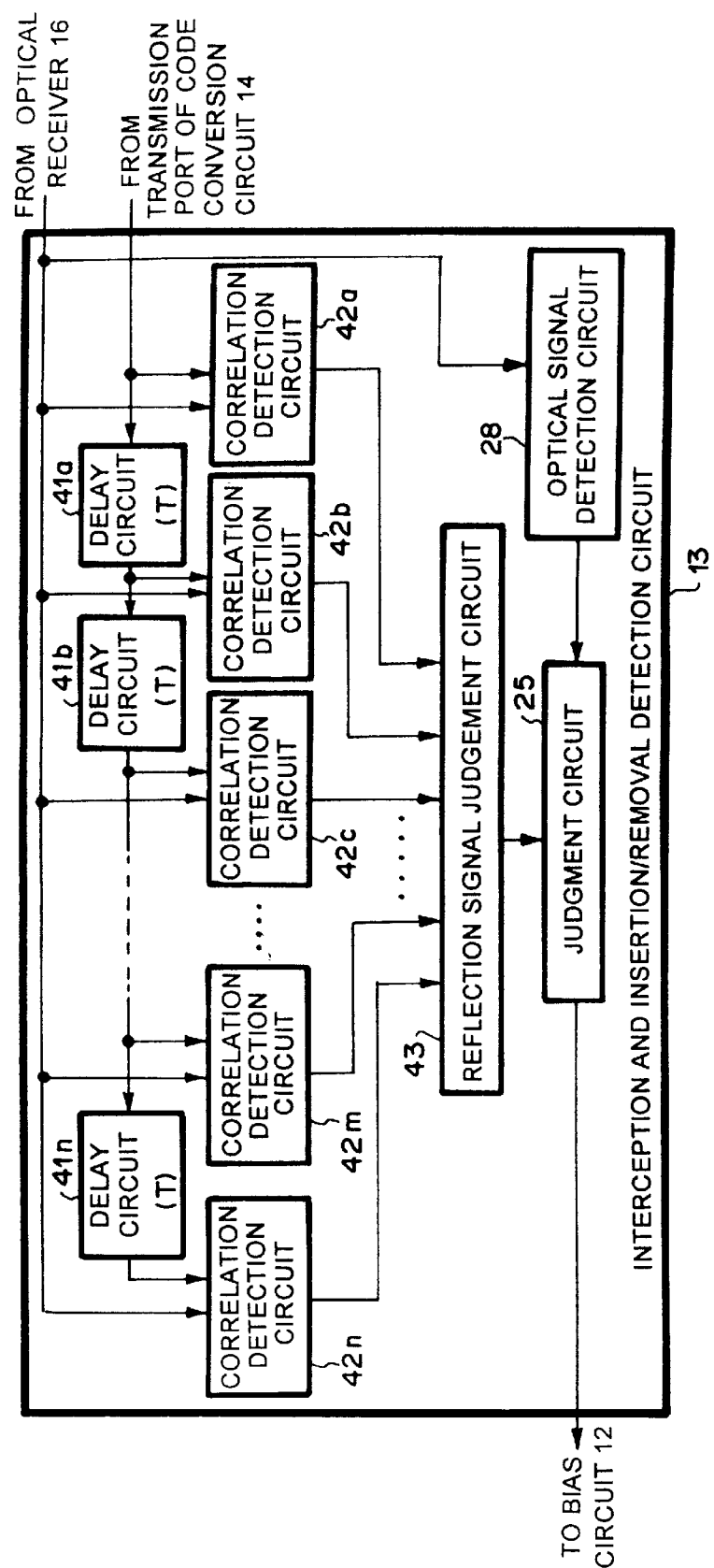
FIG. 5 is a diagram showing the construction of a spatial transmission optical transceiver according to a second embodiment of the present invention.
Figure 10:
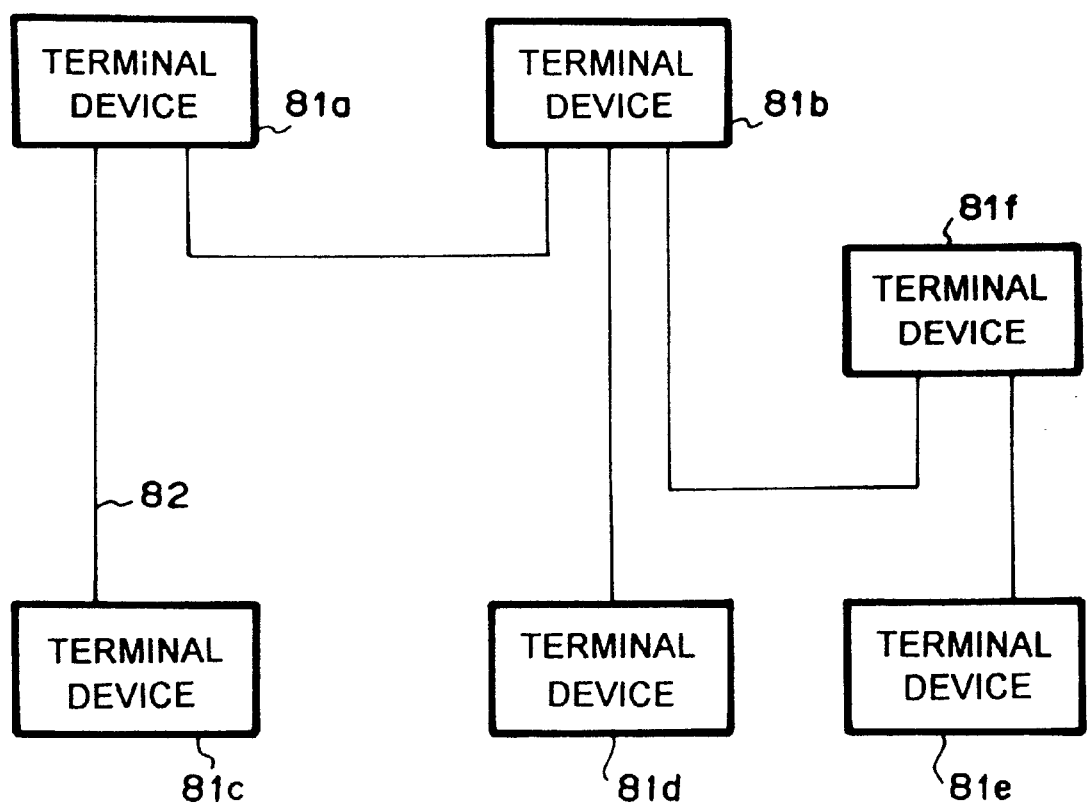
FIG. 10 is a block diagram showing an example of IEEE1394 network.
Figure 11:
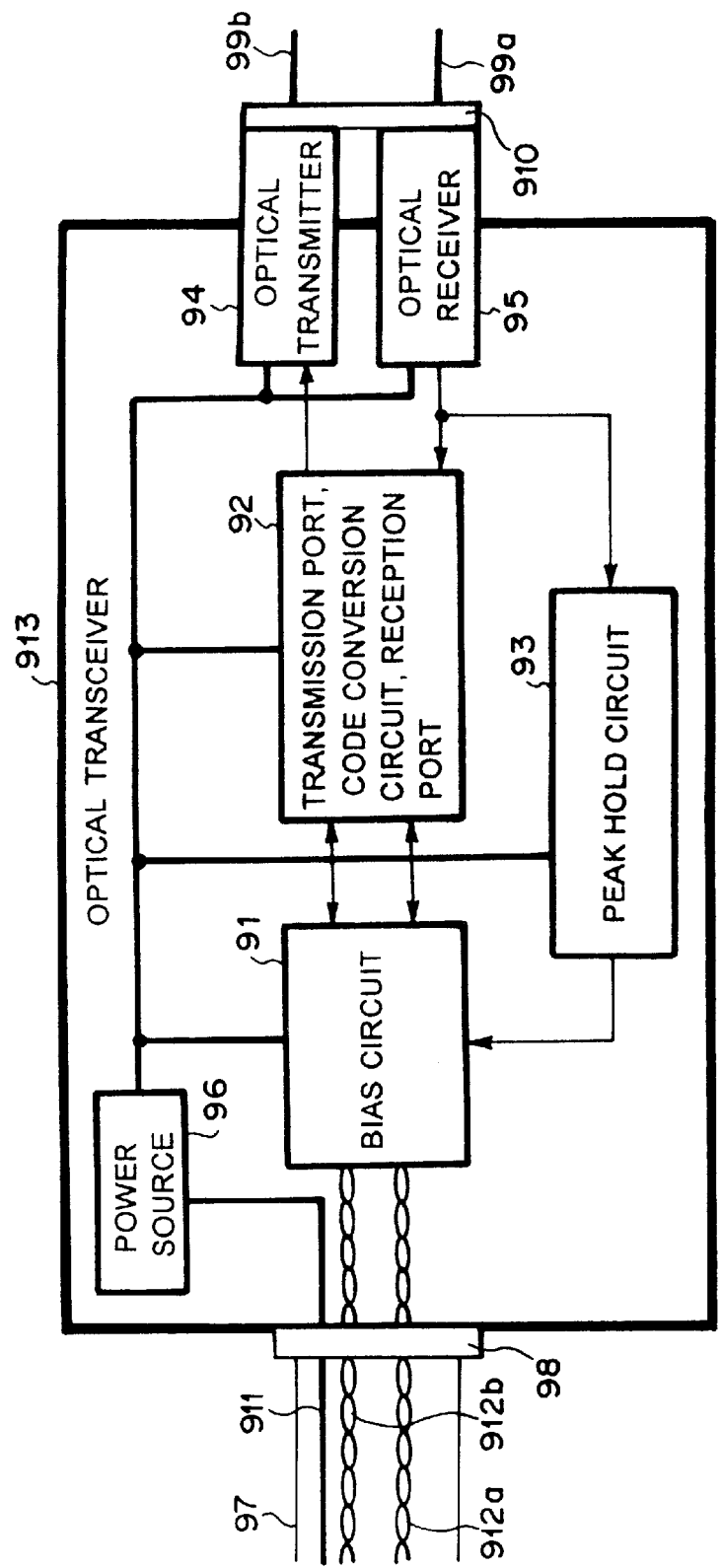
FIG. 11 is a diagram showing the construction of a conventional optical transceiver which aims to use an optical fiber for a part of a transmission path of the IEEE1394 network.

FIG. 5 is a block diagram showing the construction of the interception and insertion/removal detection circuit 13 of a second embodiment according to the present invention.

In FIG. 5, the interception and insertion/removal detection circuit 13 includes delay circuits 41a to 41n, correlation detection circuits 42a to 42n, a reflection signal judgment circuit 43, an optical signal detection circuit 26 and a judgment circuit 25.

A transmission signal which is input from the code conversion circuit to the interception and insertion/removal detection circuit 13 is delayed by T[s] every time it passes through the delay circuit 41. Here, the delay circuit 41 comprises a D-F/F circuit, and T represents the time of one bit of the transmission/reception signal. The correlation between the transmission signal passed through each delay circuit 41 and the reception signal input from the optical receiver 16 to the interception and insertion/removal detection 13 is detected by each correlation detection circuit 42. The correlation detection circuit 42 outputs an L-level signal (voltage) when the two signals are recognized to have a correlation of predetermined level or more. The reflection signal judgment circuit 43 receives the outputs of all the correlation detection circuits 42a to 42n to take the logical product therebetween, and outputs the result. The judgment circuit 25 outputs the logical product between the output of the reflection signal judgment circuit 43 and the output of the optical signal detection circuit 26 as a judgment result to the bias circuit 12.

Next, the operation of the interception and insertion/removal detection circuit will be described.

When receiving a reflection signal having a delay time of one bit or more due to transmission distance, the reception signal and any one of transmission signals which is passed through the delay circuit 41 and delayed by several bits are necessarily shifted in phase within one bit, and thus the correlation therebetween is high. The correlation detection circuit 42 to which the two signals having a high correlation at a predetermined level or more are input outputs the L-level voltage. The reflection signal judgment circuit 43 identifies that the reception signal is the reflection signal if at least one of the signals input thereto is L-level, and outputs the L-level voltage. At this time, the optical signal detection circuit 26 receives the optical signal, and thus outputs the H-level voltage. However, the judgment circuit 25 takes the logical product between the output of the reflection signal judgment circuit 43 and the output of the optical signal detection circuit 26 and outputs the L-level voltage. The bias voltage 12 to which the L-level voltage is input stops the bias voltage application to the twisted pair line 111.

Next, an embodiment of the correlation detection circuit 42 will be described with reference to the accompanying drawings.

FIG. 6 shows an embodiment of the correlation detection circuit 42. The correlation detection circuit 42 has the same construction as the reflection signal detection circuit 22 of the embodiment 1, and it is constructed by the exclusive OR circuit 23, the averaging circuit 22 and the signal detection circuit 24. The operation of the correlation detection circuit 42 is the same as the reflection signal detection circuit 22 of the embodiment 1.

Further, the delay circuit 41 may be implemented by increasing the length of the transmission path so that transmission delay occurs.

<Embodiment 3>

In order to prevent the malfunction which is caused by the reflection optical due to the interception in the neighborhood of the optical receiver, it may be adopted that the wavelength of optical emitted from the optical transmitter is varied every optical transceiver and a optical wavelength discriminator is provided at the front side of the optical receiver.

FIG. 7 is a diagram showing the construction of a optical transceiver according to a third embodiment of the present invention.

Referring to FIG. 7, an optical wavelength discriminator 61 is provided at the front stage of the optical receiver 16, and the interception and insertion/removal detection circuit 63 comprises a peak hold circuit 62. The wavelength of the optical emitted from the optical transmitter 15 is varied every optical transceiver. FIG. 8 shows the transmission characteristic of the optical wavelength discriminator 61. Considering the communication mode shown in FIG. 3, an optical signal of wavelength 1 which is emitted from the optical spatial transmission transceiver 110a is discriminated by the optical wavelength discriminator 61 provide at the front stage of the optical receiver 16 of the optical spatial transmission transceiver 110b and then reaches the optical receiver 16. However, when an optical signal of wavelength 2 emitted from the optical transceiver 110b is intercepted in the neighborhood of the optical transceiver 110b and becomes reflection optical, the optical signal of wavelength 2 cannot pass through the optial wavelength discriminator 61, and thus cannot reach the optical receiver 16. Therefore, the electrical signal output from the optical receiver 16 is set to L-level, and the interception and insertion/removal detection circuit 63 detects the interception and outputs the L-level voltage to the bias circuit 12.

With this construction, when the reflection optical generated due to the interception in the optical transmission path has wavelength 2, the interception and insertion/removal detection circuit 63 can detect the interception state, and control application or non-application of the bias voltage of the transmission/reception circuit corresponding to the twisted pair line 111 of the bias circuit 12.

<Embodiment 4>

In the above embodiments 1, 2 and 3, the detection of the optical signal is performed by the peak hold circuit. However, the detection of the signal may be performed by using a counter circuit.

Next, the operation of the counter circuit will be described.

Referring to FIG. 9, a counter circuit 72 is contained in the interception and insertion/removal detection circuit 71. Further, the counter circuit 72 may be provided in place of the peak hold circuit 21 in the interception and insertion/removal detection circuit 13 as shown in FIG. 2.

The counter circuit 72 carries out the counter operation at all times. It resets its count value every time an H-level signal is input thereto, and outputs an H-level voltage. When the signal input is kept to L-level during a fixed time, the count value is coincident with a preset judgment value T, and the counter circuit 72 outputs an L-level voltage.

The insertion/removal of a data transmission line connected to a confronting optical transceiver and the interception of a communication path in the above network can be also detected in the same manner by using the optical transceiver in which the interception and insertion/removal detection circuit 71 is constructed by using the counter circuit 72, and initialization of the IEEE1394 network can be performed.

As an application mode of the spatial transmission optical transceiver of the present invention, the optical transceiver may be installed in the terminal device, and provided with an optical interface. Further, As an adapter satisfying the IEEE1394 standard may be used not only the above optical transmission path, but also a radio transceiver using radio frequency. In this case, a transmission route having a DC power supply function and a signal line biasing function can be achieved as same as a route using the IEEE1394 standard. Still further, adapters which are conformable to USB (Universal Serial Bus), RS-232C and SCSI standards in place of IEEE1394, may be used.

As described above, according to the spatial transmission optical transceiver thus constructed, the removal of the feeder-affixed twisted pair lines which are connected to a confronting optical transceiver and conformable to the IEEE1394 standard, and the interception of the communication path can be detected. Therefore, even when an optical spatial transmission system using a spatial medium for a part of the transmission path is applied, the initialization of the IEEE1394 network, that is, the address setting of the network, recognition of connected equipment, etc. can be performed. Accordingly, in the IEEE1394 network, an optical communication system using space as a communication medium can be used, and the rewiring problem due to the movement of the terminal devices and the problem of spoiling the beauty of the appearance due to the arrangement of cables can be solved.

Further, with respect to leakage of reflection optical due to interception in the neighborhood of a optical transceiver, according to the optical transceiver of the present invention, it can be detected whether the reception signal is caused by the reflection optical, and thus the initialization of the IEEE1394 network can be performed irrespective of the interception in the neighborhood of the optical transceiver.

Although the present invention has been shown and described with respect to best mode embodiments thereof, it should be understood by those skilled in the art that the foregoing and various other changes, omission, and additions in the form and detail thereof may be made therein without departing from the spirit and scope of the present invention.

What is claimed is:

1. A spatial transmission light transceiver for spatial transmission comprising:

transmitting means for converting an electrical signal from a connected terminal device to an optical signal so as to emit the optical signal to space;

receiving means for converting an optical signal from space to an electrical signal so as to transmit the electric signal to the terminal device;

optical signal detection means for detecting the presence or absence of the optical signal received from space;

reflection signal detection means for detecting that the reception signal received from space is a reflection signal of the emitted optical signal, said reflection signal occurring on account of an interception of a communication path; and a judgment circuit for detecting an interception of a communication path of the optical signal and an insertion/removal of a data transmitting line connected to a confronting optical transceiver on the basis of the detection results of said optical signal detection means and reflection signal detection means.

2. The spatial transmission light transceiver as set forth in claim 1, further comprising:

a data transmitting line for being connected to the terminal device and operating as set forth in IEEE1394 Standard.

3. The spatial transmission light transceiver as set forth in claim 2, wherein said reflection signal detection means comprises an exclusive OR circuit for taking the exclusive OR between the electrical signal to which the received optical signal is converted and the transmitted electrical signal, an averaging circuit for averaging the amplitude of the output signal of said exclusive OR circuit, and a detection circuit for detecting the signal on the basis of the output voltage thereof.

4. The spatial transmission optical transceiver as set forth in claim 2, wherein said reflection signal detection means comprises:
      plural delay circuits for delaying the electrical signal from the terminal device an exclusive OR circuit for taking the exclusive OR between the output signal of each of said delay circuits and the electrical signal to which the received optical signal is converted; an averaging circuit for averaging the amplitude of the output signal of said exclusive OR circuit; and a detection circuit for detecting the signal on the basis of the output voltage thereof.

5. The spatial transmission light transceiver as set forth in claim 1, wherein said judgment circuit is an AND circuit for ANDing the detecting result of said optical signal detection means and the detecting result of said reflection signal detection means.

6. The spatial transmission light transceiver as set forth in claim 5, further comprising a bias circuit applying a bias voltage to a data transmission line connected to the terminal device when a communication is made, and stopping the bias voltage application to the data transmission line when the interception of the communication path or the removal of the signal-line occurs.

7. The spatial transmission light transceiver as set forth in claim 5,
wherein said reflection signal detection means comprises an exclusive OR circuit for taking the exclusive OR between the electrical signal to which the received optical signal is converted and the electrical signal from the terminal device, an averaging circuit for averaging the amplitude of the output signal of said exclusive OR circuit, and a detection circuit for detecting the signal on the basis of the output voltage thereof.

8. The spatial transmission optical transceiver as set forth in claim 5,
wherein said reflection signal detection means comprises: plural delay circuits for delaying the electrical signal from the terminal device; an exclusive OR circuit for taking the exclusive OR between the output signal of each of said delay circuits and the electrical signal to which the received optical signal is converted; an averaging circuit for averaging the amplitude of the output signal of said exclusive OR circuit; and a detection circuit for detecting the signal on the basis of the output voltage thereof.

9. The spatial transmission light transceiver as set forth in claim 1,
further comprising a bias circuit applying a bias voltage to a data transmission line connected to the terminal device when a communication is made, and stopping the bias voltage application to the data transmission line when the interception of the communication path or the removal of a signal line occurs.

10. The spatial transmission light transceiver as set forth in claim 9,
wherein said reflection signal detection means comprising an exclusive OR circuit for taking the exclusive OR between the electrical signal to which the received optical signal is converted and the electrical signal from the terminal device, an averaging circuit for averaging the amplitude of the output signal of said exclusive OR circuit, and a detection circuit for detecting the signal on the basis of the output voltage thereof.

11. The spatial transmission optical transceiver as set forth in claim 9,
wherein said reflection signal detection means comprises: plural delay circuits for delaying the electrical signal from the terminal device; an exclusive OR circuit for talking the exclusive OR between the output signal of each of said delay circuits and the electrical signal for which the received optical signal is converted; an averaging circuit for averaging the amplitude of the output signal of said exclusive OR circuit; and a detection circuit for detecting the signal on the basis of the output voltage thereof.

12. The spatial transmission light transceiver as set forth in claim 1,
wherein said reflection signal detection means comprises an exclusive OR circuit for taking the exclusive OR between the electrical signal to which the received optical signal is converted and the electrical signal from the terminal device 1, an averaging circuit for averaging the amplitude of the output signal of said exclusive OR circuit, and a detection circuit for detecting the signal on the basis of the output voltage thereof.

13. The spatial transmission optical transceiver as set forth in claim 1,
wherein said reflection signal detection means comprises: plural delay circuits for delaying the electrical signal from the terminal device; an exclusive OR circuit for taking the exclusive OR between the output signal of each of said delay circuits and the electrical signal to which the received optical signal is converted; an averaging circuit for averaging the amplitude of the output signal of said exclusive OR circuit; and a detection circuit for detecting the signal on the basis of the output voltage thereof.

14. A spatial transmission light transceiver for spatial transmission comprising:
transmitting means for converting an electrical signal from a connected terminal device to an optical signal so as to emit the optical signal to space;
receiving means for converting an optical signal from space to an electrical signal so as to transmit the electric signal to the terminal device;
optical signal detection means for detecting the presence or absence of the optical signal received from space; and
reflection signal detection means for detecting that the reception signal received from space is a reflection signal;
wherein said reflection signal detection means comprises an exclusive OR circuit for taking the exclusive OR between the electrical signal to which the received optical signal is converted and the electrical signal from the terminal device, an averaging circuit for averaging the amplitude of the output signal of said exclusive OR circuit, and a detection circuit for detecting the signal on the basis of the output voltage thereof.

15. A spatial transmission light transceiver for spatial transmission comprising:
transmitting means for converting an electrical signal from a connected terminal device to an optical signal so as to emit the optical signal to space;
receiving means for converting an optical signal from space to an electrical signal so as to transmit the electric signal to the terminal device;
optical signal detection means for detecting the presence or absence of the optical signal received from space; and
reflection signal detection means for detecting that the reception signal received from space is a reflection signal
wherein said reflection signal detection means comprises: plural delay circuits for delaying the electrical signal from the terminal device; an exclusive OR circuit for taking the exclusive OR between the output signal of each of said delay circuits and the electrical signal to which the received optical signal is converted; an averaging circuit for averaging the amplitude of the output signal of said exclusive OR circuit; and a detection circuit for detecting the signal on the basis of the output voltage thereof.

16. A spatial transmission light transceiver for spatial transmission comprising:
optical wavelength discriminating means for:
(a) blocking transmission of an optical signal which is transmitted from the transceiver and reflected toward the transceiver on account of an interception of a communication path; and (b) allowing transmission of an optical signal which is emitted from another transceiver that has a wavelength different from the wavelength of the optical signal transmitted from the transceiver;

receiving means for converting the optical signal from said optical wavelength discriminating means to an electrical signal so as to transmit the electric signal to a terminal device;

optical signal detection means for detecting the presence or absence of the optical signal from said receiving means; and path interception and signal-line insertion/removal notifying means for notifying the detection result to the terminal device.

17. The spatial transmission optical transceiver as set forth in claim 16, wherein the terminal device and other spatial transmission optical transceiver are connected by the data transmission line based on the IEEE1394 Standard.

18. The spatial transmission light receiver as set forth in claim 16,
wherein said optical wavelength discriminating means has an optical transmission characteristic for:
(a) blocking transmission of an optical signal which is transmitted from the transceiver and reflected toward the transceiver on account of an interception of a communication path, and
(b) allowing transmission of an optical signal which is emitted from another transceiver that has a wavelength different from the wavelength of the optical signal transmitted from the transceiver.

* * * * *